Patented Sept. 19, 1922.

1,429,276

UNITED STATES PATENT OFFICE.

LEWIS DAVIS, OF WORCESTER, MASSACHUSETTS, ASSIGNOR TO BREWER & COMPANY, INCORPORATED, A CORPORATION OF MASSACHUSETTS.

TABLET FOR PRODUCING IODINE.

No Drawing.  Application filed November 26, 1921. Serial No. 518,009.

*To all whom it may concern:*

Be it known that I, LEWIS DAVIS, a citizen of the United States, residing at Worcester, in the county of Worcester and State of Massachusetts, have invented a new and useful Tablet for Producing Iodine, of which the following is a specification.

This invention relates to a composition, preferably in tablet form, for use in generating iodine in a free state.

The principal object of the invention is to provide such a mixture in a solid state which will be acted upon in the presence of water to liberate free iodine; to provide the same in such condition that it can be molded into the form of a tablet very conveniently; to provide this composition of such ingredients that the tablet or composition can be dissolved in the mouth without deleterious effects, and to so combine the ingredients that it will serve as a source of free iodine for antiseptic, germicidal and therapeutic purposes in general.

Generally speaking, the invention comprises a mixture of inorganic salts and an acid compound, preferably of urea, in molecular proportions suitable for liberating free nascent iodine on contact with water and so compounded that it can be molded into tablet form and the iodine can be produced in the mouth for treatment of diseases of the throat and other local effects.

I prefer to take advantage of the well-known fact that certain salts containing bromine can be decomposed to produce free bromine and that the nascent bromine in the presence of certain compounds of iodine will liberate the latter. For this purpose I preferably employ potassium bromide, potassium bromate, potassium iodide, and a solid acid compound which will not be affected by the ordinary ingredients necessary to form the mixture into a tablet and will remain for an indefinite time in that form without deterioration, and which will, when moistened in contact with the above mentioned compounds or equivalents, react with the potassium bromide to liberate the bromine for the purpose above specified. I am aware of the fact that if desired alkali salts, as for example, sodium bromide, sodium bromate and sodium iodide, can be used and even the corresponding compounds of lithium and ammonia, but the potassium compounds are more effective and I prefer to use them.

The preferred procedure is to mix the solid salts in substantially the proportions of 5.95 KBr; 1.67 $KBrO_3$; 9.96 KI by weight. With this is used urea nitrate in the proportions of 6.06 salt mixture to 8.5 urea nitrate by weight. The salts mixture is granulated in one portion and the acid compound in another, both being mixed before compressing. These compounds, as so far described, can be mixed solid and used in powdered form, if desired, but I prefer to form them into a tablet with a base consisting of saccharum lactis, sweetened with sodium benzosulphinide, granulated with a suitable adhesive and flavored with essential oils. I prefer to make a tablet so compounded that it will generate, on contact with water, a maximum of .075 grains of free iodine.

The chemical action on contact with water is indicated by the following equations:

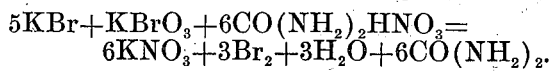
$$5KBr + KBrO_3 + 6CO(NH_2)_2HNO_3 =$$
$$6KNO_3 + 3Br_2 + 3H_2O + 6CO(NH_2)_2.$$

The bromine thus liberated decomposes the potassium iodide present, as per:

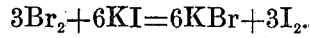
$$3Br_2 + 6KI = 6KBr + 3I_2.$$

It is quite probable that in presence of the free iodine, the urea set free is partially converted into ammonium carbonate, as per:

$$CO(NH_2)_2 + 2H_2O \rightleftharpoons (NH_4)_2CO_3.$$

The urea is present merely as a vehicle for the nitric acid and is left in a free state in the first reaction as the first equation shows.

In addition to the substitution of other alkali salts for the potassium salts above mentioned, I am aware of the fact that the other solid acid compounds of urea can be employed in this reaction, at least theoretically, but they usually have some defect that renders them largely unsuitable for the particular uses to which I prefer to put this invention. For example, urea oxalate can be used in place of the urea nitrate but its use is restricted to external use because it is poisonous. Furthermore, solid tartaric and citric acids, as well as the acid salts of phosphoric and tartaric acids may be used in place of urea nitrate. These all occur in a solid state but their effectiveness is much less than that of urea nitrate and some of them have other defects. The best results, particularly from a therapeutic standpoint, are obtained by the use of the ingredients first above mentioned.

In the preferred form of the invention above described, a tablet is produced which has good keeping qualities and can be administered simply by dissolving it in the mouth. The only thing required to bring about the desired reactions is to bring it into contact with water. The action when this tablet is dissolved in the mouth is not sudden but is slow. It takes a considerable period of time to dissolve the tablet and the iodine is produced in small quantities. The total amount of iodine produced by one tablet is considerably less than the maximum prescribed in the Medical Literature for an internal dose. In fact, it is so much smaller than that that if two or three tablets were taken at once no dangerous action of the iodine would take place.

In this way, I have provided what has been desired for a long time by the medical profession, namely a palatable germicidal throat tablet which generates iodine in the free state on contact with the saliva. No statement is made here as to the advantages of iodine used for germicidal purposes as that is well known in the medical profession, my invention relating to a practical way of producing the iodine in the locations desired.

Although I have explained and described only certain modifications of the preferred procedure, I am aware of the fact that similar effects can be obtained by departures from the exact procedure above mentioned within the knowledge of expert chemists without departing from the scope of the invention as expressed in the claims. Therefore, I do not wish to be limited to the exact proportions specified herein or to the exact order of procedure, but what I do claim is:—

1. A composition of matter for the liberation of iodine on contact with water, comprising compounds of bromine with an element of the alkali group, and a solid acid compound which upon being treated with water in the presence of said alkali compounds will decompose them, setting free nascent bromine, and comprising, in addition, an iodide of one of the alkali metals adapted to be decomposed by nascent bromine to produce iodine in a free state.

2. A composition of matter for use for antiseptic, germicidal or therapeutic purposes, comprising alkali salts of bromine and iodine and urea nitrate.

3. A composition of matter for the purpose described, comprising potassium bromide, potassium bromate, potassium iodide, and urea nitrate.

4. A molded solid tablet for the purpose described, comprising potassium bromide, potassium bromate, potassium iodide, and urea nitrate in substantially the proportions described.

5. A tablet for the purpose described, comprising a mixture of alkali salts of bromine, an iodide of an alkali metal, a solid acid compound capable of setting free an acid in the presence of water to decompose a bromine salt present and set free the bromine in such condition as to, in turn, decompose the iodide and set free the iodine.

6. A solid tablet for medicinal use, comprising a solid acid compound of urea, a binary compound of an alkali metal and bromine, and a binary compound of an alkali metal and iodine in the presence of potassium bromate.

In testimony whereof I have hereunto affixed my signature.

LEWIS DAVIS.